K. WESSEL.
MACHINE FOR MAKING INSULATING SHEETS.
APPLICATION FILED SEPT. 4, 1917.
1,277,510.
Patented Sept. 3, 1918.
5 SHEETS—SHEET 1.
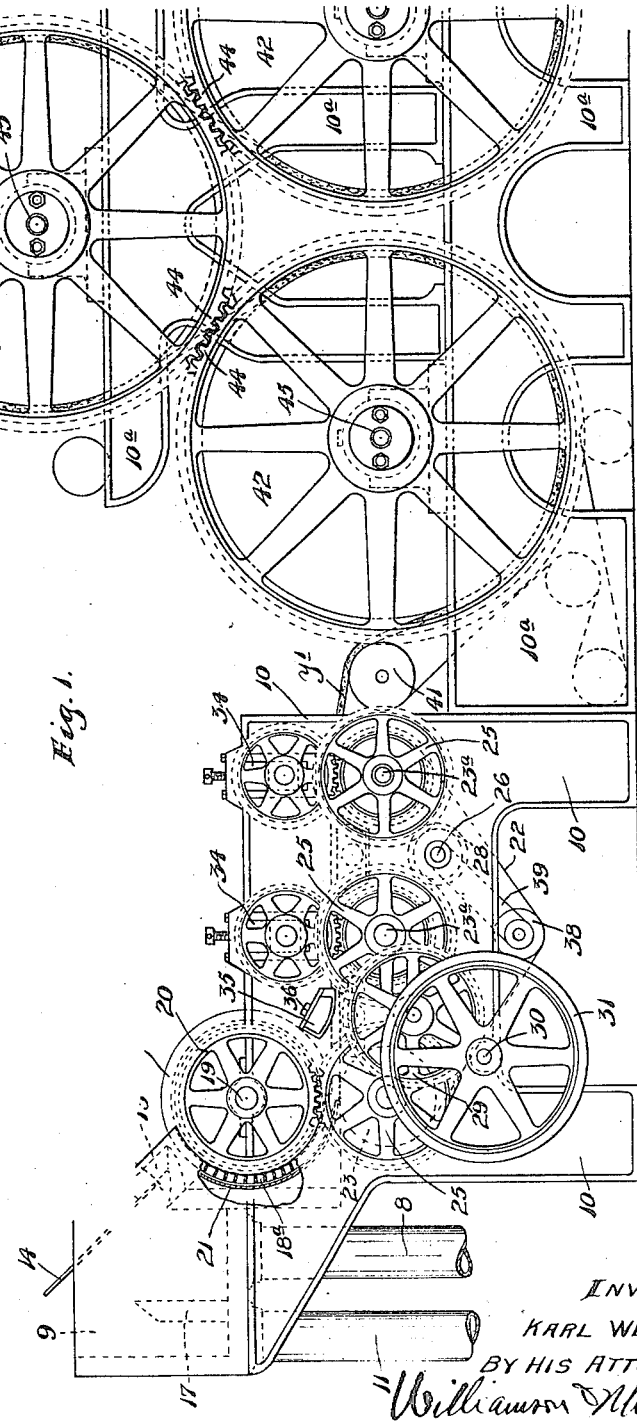
WITNESSES.
H. L. Opsahl.
E. G. Wells
INVENTOR.
KARL WESSEL
BY HIS ATTORNEYS
Williamson Michael

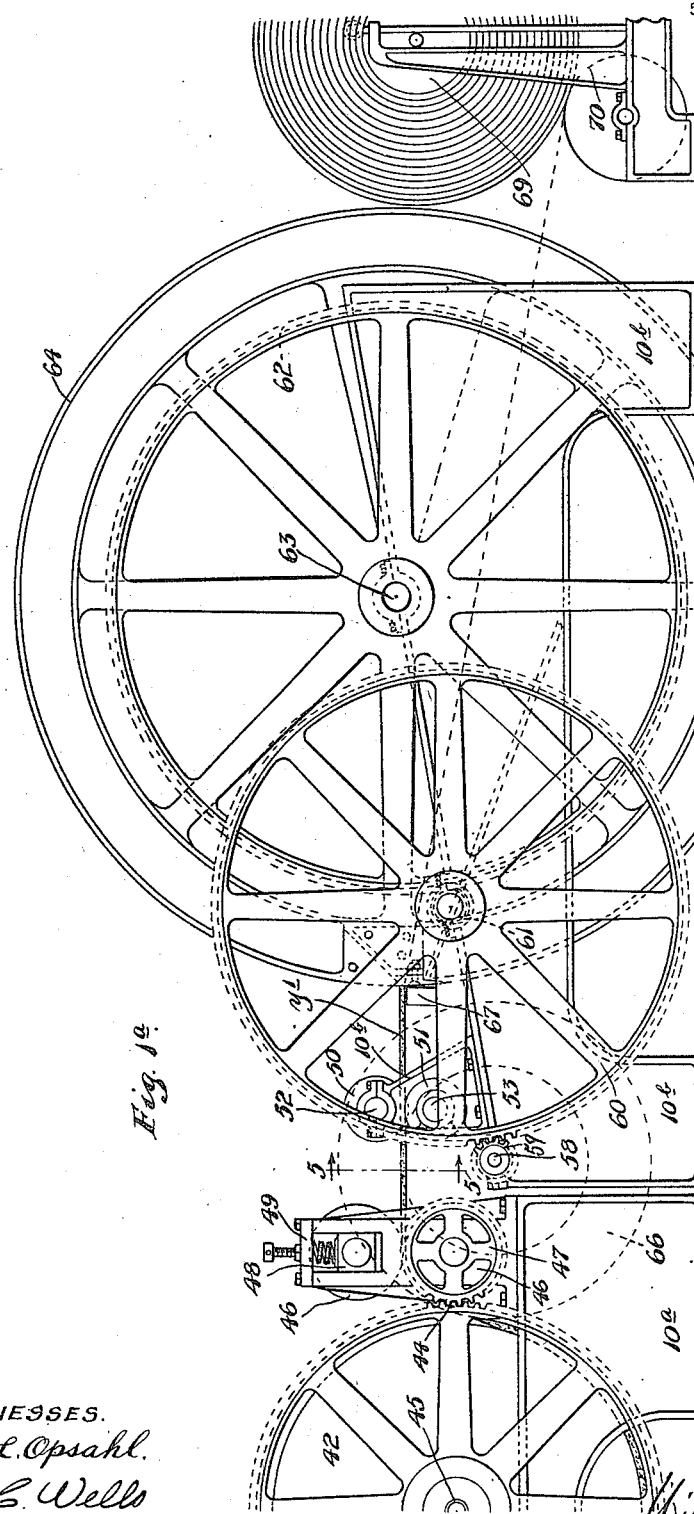

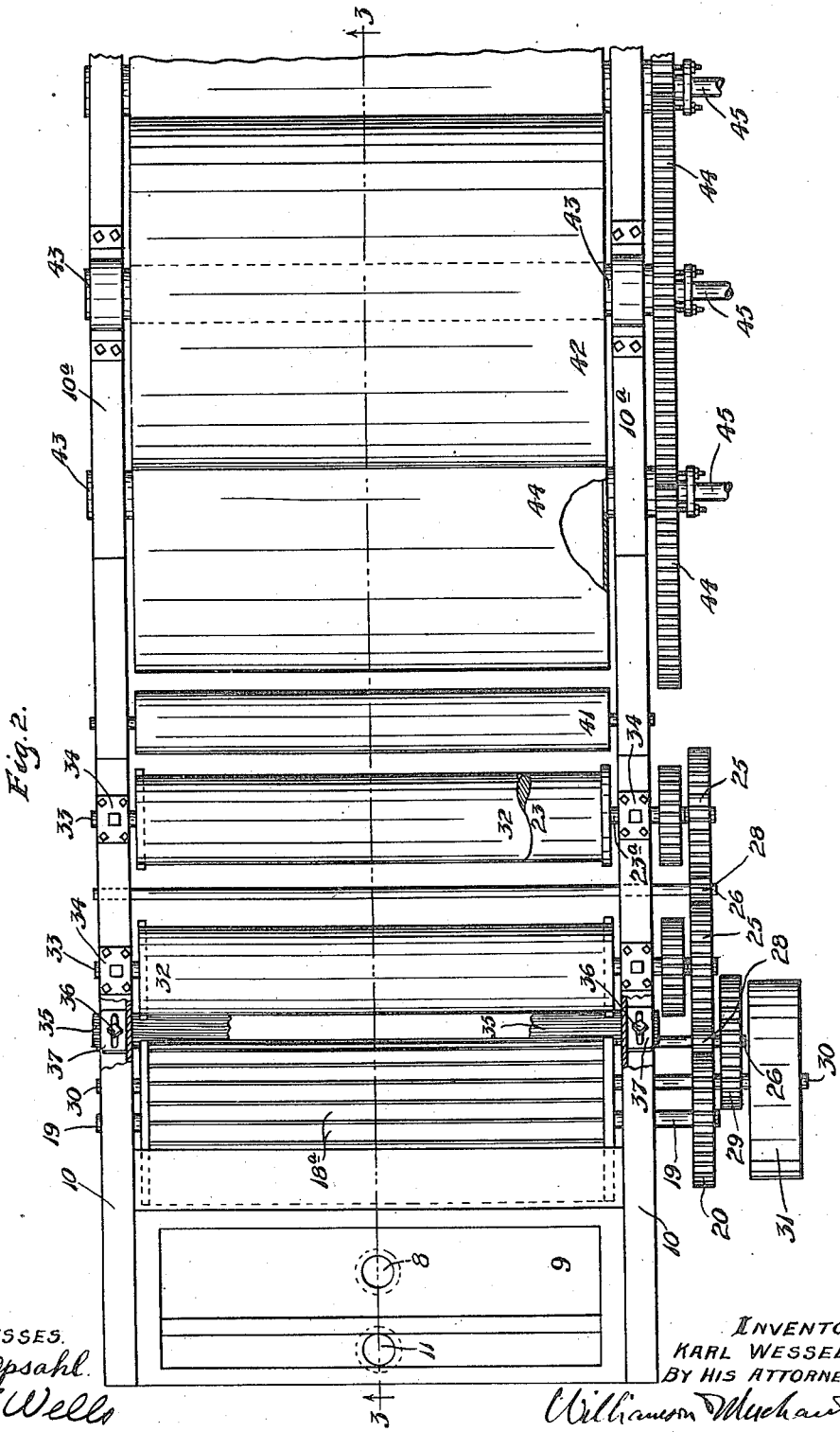

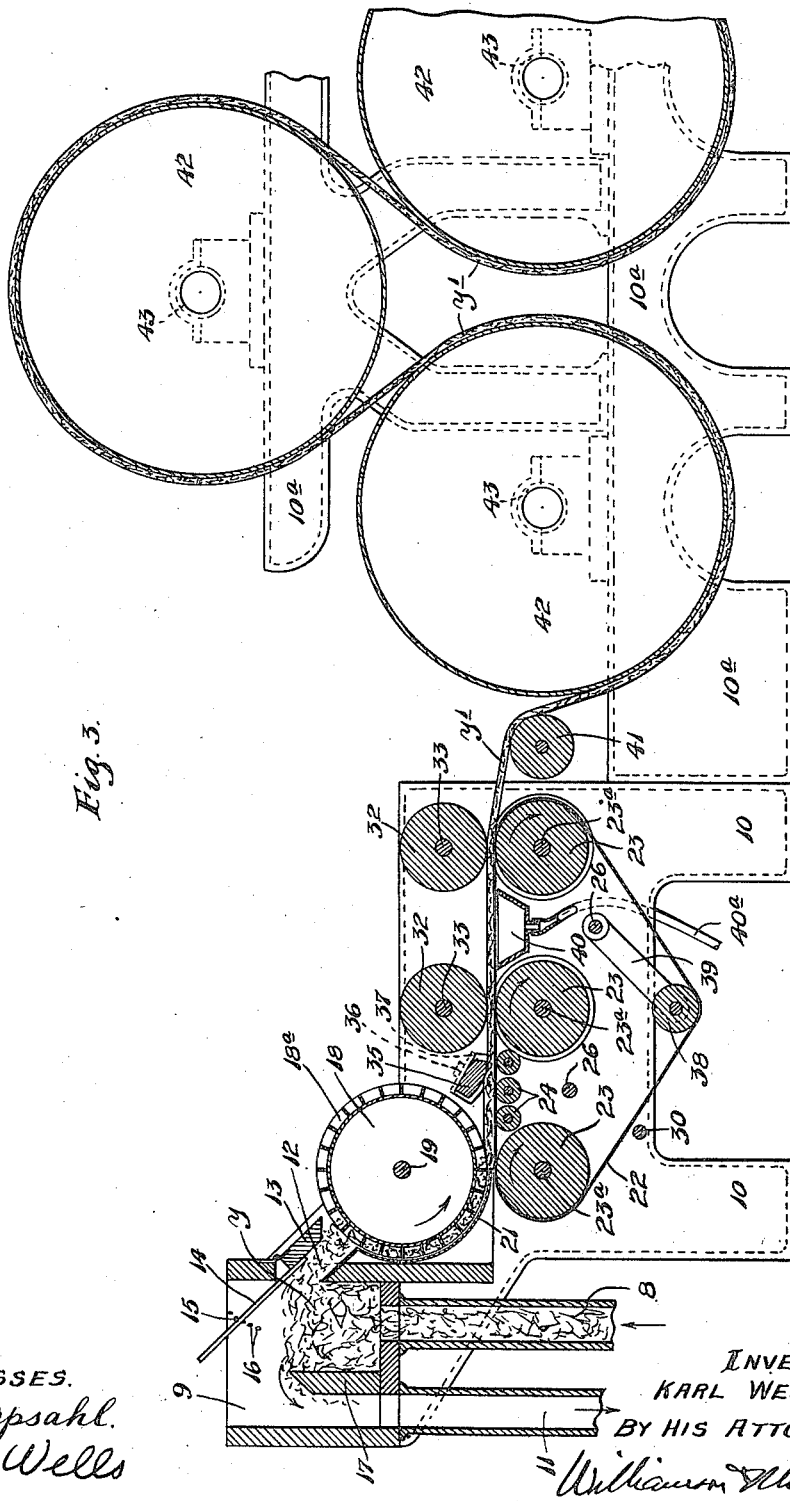

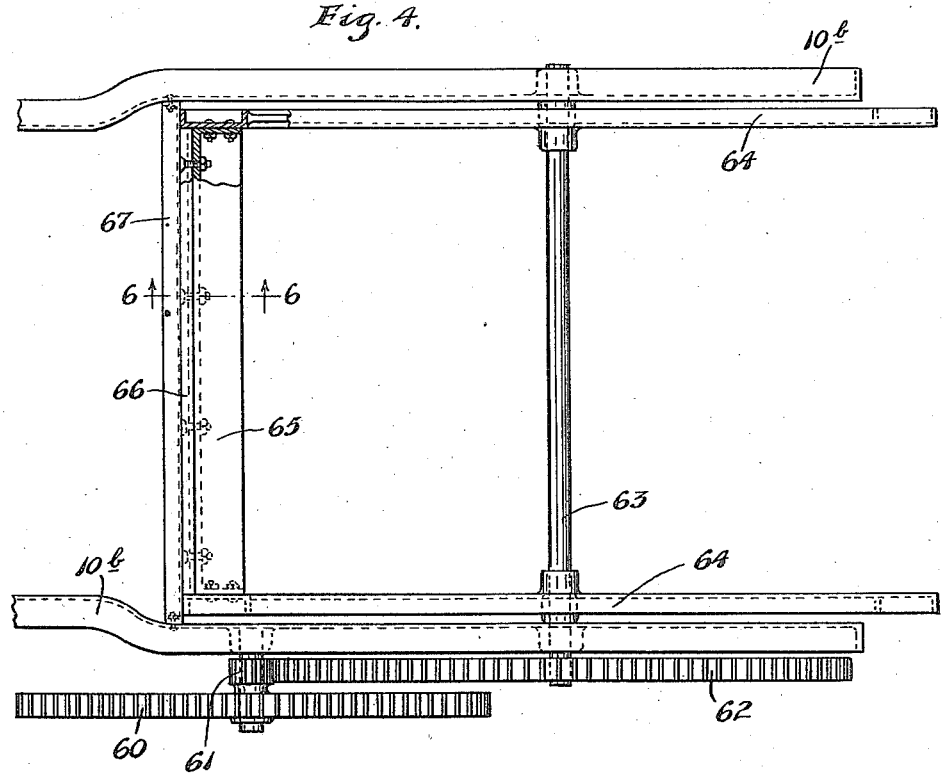
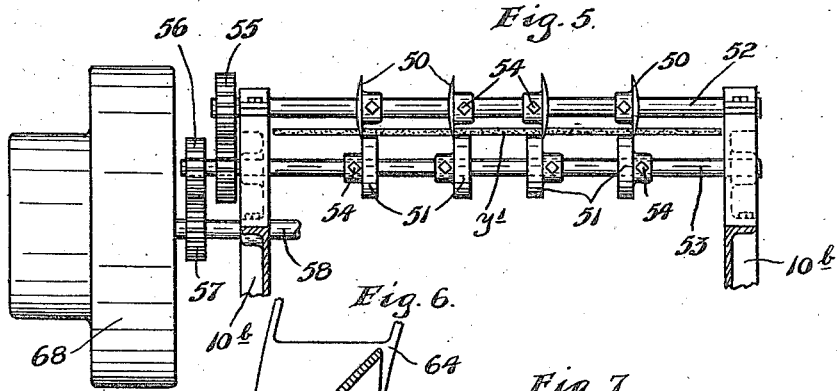
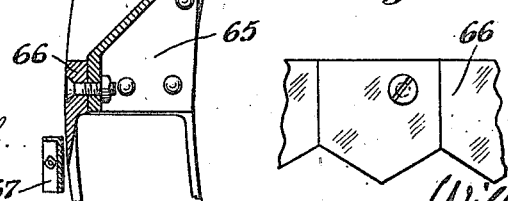
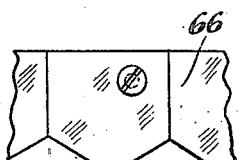

UNITED STATES PATENT OFFICE.

KARL WESSEL, OF ST. PAUL, MINNESOTA.

MACHINE FOR MAKING INSULATING-SHEETS.

1,277,510.  Specification of Letters Patent.  Patented Sept. 3, 1918.

Application filed September 4, 1917. Serial No. 189,493.

*To all whom it may concern:*

Be it known that I, KARL WESSEL, a citizen of the United States, residing at St. Paul, in the county of Ramsey and State of Minnesota, have invented certain new and useful Improvements in Machines for Making Insulating-Sheets; and I do hereby declare the following to be a full, clear, and exact description of the invention, such as will enable others skilled in the art to which it appertains to make and use the same.

My present invention has for its object to provide a machine for the continuous and rapid commercial production, in sheet form, of insulating material, such as made from vegetable fiber and used for various insulating purposes.

Particularly, the present machine is designed for making insulating material of the character disclosed and claimed in my companion application, S. N. 189,492, filed of date, September 4, 1917, and entitled "Heat insulating material"; but the machine is, nevertheless, capable of general use for making other heat insulating sheets from fibrous materials that are adapted to be carried in or with water.

The heat insulating material of my companion application is made from flax, cereal straw, and peat, reduced approximately to what is known as "half stock." In the use of this machine for making insulating sheets from these substances, and combination "half stock" is carried with the water into a feed box of novel construction, and from thence, is fed to the so-called distributing drum having peripheral pockets which serve to regulate the amount of material fed, and to distribute the same in a heavy sheet or layer upon a perforated belt that runs between coöperating compressing rollers, by which most of the water is squeezed from the sheet. Before passing to the squeezing rollers, the sheet is carried under a so-called trowel board which serves to slightly compress the sheet and to smooth and even up the surface thereof. Between certain of the compressing rollers, additional water is drawn off by an underlying trough which is subject to partial vacuum or suction.

From the compressing rollers, the sheet is passed in a zig-zag course under and over a series of steam heated drying drums arranged in sufficient number to insure good drying of the sheet on its continuous passage through the machine.

From the drying drums, the sheet is passed to cutters, certain of which serve to cut the same into longitudinal strips and others of which, when operated, serve to cut the strips into the desired lengths.

In the accompanying drawings which illustrate the commercial form of the machine, like characters indicate like parts throughout the several views. Referring to the drawings, Figs. 1 and 1$^a$ are supplemental views in side elevation showing the complete machine, except that the drying drums, in practice, will be greater in number than illustrated;

Fig. 2 is a plan view of the parts shown in Fig. 1;

Fig. 3 is a vertical section taken approximately on the line 3—3 of Fig. 2;

Fig. 4 is a plan view of certain of the parts shown in Fig. 1$^a$, with some parts removed;

Fig. 5 is a transverse vertical section taken approximately on the line 5—5 of Fig. 1$^a$;

Fig. 6 is a detail in section on the line 6—6 of Fig. 4; and

Fig. 7 is a fragmentary view in front elevation of the knife carried by the rotary cutter.

The "half stock" $y$ (see Fig. 3) floating in water, is fed upward through a feed pipe 8, through the bottom of and into the feed box 9 which is suitably supported on the head frame 10 of the machine. The feed box 9 has a water return pipe 11 leading from the bottom thereof. The pipes 8 and 11 would preferably be connected with the vat containing water and the supply of "half stock" from which the insulating sheet is to be formed; and suitable means such as a rotary pump will be provided for producing a forced circulation upward through pipe 8 into box 9, and from thence, back to the vat or supply receptacle. In its front side, the feed box 9 is provided with a discharge orifice 12 adapted to be closed or to be opened to any desired extent by a gate 13 shown as provided with an operating lever 14 adapted to be set in different adjustments to hold the gate 13 open more or less, by means of a pin 15 inserted into any one of a series of pin seats 16 in one of the end walls of the box 9. Between the upper extremities of the pipes 8 and 11, the box 9 is provided with a partition 17 that terminates above the lower portion of the orifice 12, but materially below the top of the feed box.

Working adjacent to but below the discharge orifice 12 is the so-called distributing drum 18 which has peripheral pockets 18ª shown as extended from end to end thereof, and of course, closed at their ends. The said drum 18 is secured on a shaft 19 that is journaled in the head frame 10 and is provided at one end with a spur gear 20 (see Figs. 1 and 2), the said gear 20 being indicated in Fig. 1 in part by dotted lines.

An imperforate metal deck 21 (see Fig. 3) extends from the lower portion of the discharge orifice 12 to a point close to the open outer portion of the pockets 18ª, and from thence, has a cylindrical form and closely follows the exterior of the distributing drum to a point immediately below the axis thereof.

The distributing drum 18 is rotated in the direction of the arrow marked thereon in Fig. 3, and the wet "half stock" contained in the pockets thereof is delivered over the segmental deck 21 and onto the upper receiving portion of the endless perforated apron 22, preferably made of wire screen. This apron 22 runs over large bed rollers 23 and over small bed rollers 24, which latter are idle rollers. The rollers 23 are secured to shafts 23ª journaled in the head frame 10 and provided, each at one end with a spur gear 25. The gear 25 of the first or left roller 23, as shown in the drawings meshes with the gear 20 of the distributing drum 18 journaled in the head frame 10 and extending transversely thereof, between the gears 25 are countershafts 26, which, at their ends, have small pinions 28 that mesh with the adjacent gears 25 and thus connect the same to move synchronously and all in the same direction, to-wit, in the direction of the arrows marked on Fig. 3. On one of the said counter shafts 28 is a spur gear 29 that meshes with a spur pinion on a lower counter shaft 30, which, at one end, is provided with a pulley 31 over which a power driven belt, not shown, may be run to impart rotary motion to the movable parts above noted.

Overlying the intermediate and rear or right hand roller 23 are coöperating presser rollers 32, the shafts 33 of which are journaled in bearings 34 that are vertically adjustable in the sides of the head frame 10. Adjustment of the rollers 32 serves to set the same for proper pressure on the formed insulating sheet $y^1$ and they coöperate with the respective underlying rollers 23 to afford the so-called presser or wringing rollers. The second or right hand pair of presser rollers should be set a little closer together than the first pair, so as to produce the progressively increasing pressure.

In passing from the distributing drum 18 to the first pair of presser rollers, the insulating sheet, together with the perforated apron 22, move over the small idle rollers, and the upper surface of the insulating sheet is carried under and is scraped by the lower edge of the so-called trowel board or bar 35 and the upper surface of said insulating sheet is, as already stated, smoothed off and evened up so that the sheet is given the desired initial thickness. This trowel board 35, at its ends, works through oblique openings in the sides of the head frame 10, and is made vertically adjustable by screws or bolts 36 (see particularly Fig. 2) that works through slots of oblique lugs 37 on the sides of the said head frame 10.

The lower portion of the perforated belt or screen 22 is downward pressed and the belt is kept taut by an idle roller 38 journaled to the ends of the arms 39 pivotally mounted on the sides of the frame 10.

In passing from the first to the second set of presser rollers, the perforated apron 22 and the insulating sheet pass directly over a trough-like suction box 40 that is suitably supported by the frame 10 and is connected by a pipe 40ª to the suction side of the frame or vacuum pump not shown.

From the last pair of presser rollers the insulating sheet $y^1$ passes over an idler roller 41 journaled on the frame 10, and from thence, it passes alternately under and then over large hollow drying drums 42 that are suitably journaled on an intermediate frame 10ª and are provided with projecting trunnions 43 interconnected for common rotation by intermeshing gears 44, one of which will be driven from certain of the rollers already noted, in any suitable or well konwn way.

The drying drum 42 will be kept hot by steam supplied thereto by steam connections of any suitable construction and will include, for example, steam supply pipes 45 (see Fig. 2) connected thereto by suitable swivel joints, as is customary where drying drums of this character are used. From the last drying drum, the dried insulating sheet $y^1$ (see Fig. 1ª) passes between a pair of so-called calender rollers 46, the shaft of the lower of which has a spur pinion 47 that meshes with the spur gear 44 of the said last or rearmost drying drum. The shaft of the upper roller 46 is journaled in bearings 48 that are vertically adjustable in brackets 49 of the frame 10ª. These calender rollers serve to complete the compression of the insulating sheet and serve to give finish to the surface thereof. The insulating sheet of this machine is preferably made in very wide sheets, that is, in sheets that are much wider than usually desired for commercial use and are automatically cut by continuous operation into a multiplicity of narrow sheets, by the action of rotary cutters arranged in the desired number and adjustment. These cutters involve sharp edged cutting disks 50, and coöperating shearing wheels 51 which, respectively, are secured on shafts 52 and 53, with freedom for lateral adjustments transversely of the machine, by means of set screws 54 or other suitable devices, (see Fig. 5). The shafts 52 and 53 are suitably journaled in the sides of the rear frame $10^b$ (see Figs. 4, $1^a$ and 5) and are connected for constant rotation in reverse directions by small intermeshing gears 55, (see Fig. 5).

The lower shaft 53 is also provided with a spur gear 56 that meshes with a spur gear 57 in a transverse counter shaft 58, which latter is suitably driven and provided at its opposite end with a small spur pinion 59 that meshes with a large spur gear 60. The gear 60 is suitably journaled on one side of the frame $10^b$ (see Figs. $1^a$ and 4) and on its hub carries a small spur pinion 61. The pinion 61 meshes with a large spur gear 62 on one end of a transverse shaft 63 which, just inside of the sides of the frame $10^b$, carries a pair of laterally spaced wheels or disk-like head plates 64. These wheels 64 carry a heavy transverse bar 65 to which is bolted, or otherwise, rigidly secured a transverse knife or cutter blade 66. The cutting edge of this knife 66 (see Fig. 7) is preferably serrated and advisably made up of a multiplicity of sections independently secured to the said bar 65. The cutter bar 66 is arranged to work in close contact with a shearing bar 67 over which the insulated sheet $y^1$ is fed after having passed the longitudinal cutters.

Under rotation of the knife carrying wheel 64, the blade 66 will be intermittently moved past and in coöperation with the shearing bar 67 and caused to cut the insulating sheet $y^1$ transversely into sections of the desired length. The length of the sections thus cut will depend on the speed of rotation of the wheel 64 in respect to the speed of the other moving parts described, and this variable drive may be afforded in any one of the many well known ways, for example, it might be produced by a power-driven belt run over one or the other of the surfaces of the stepped pulleys 68 (see Fig. 5) which is applied on one end of the shaft 58.

Sometimes it will be desirable not to cut the insulating sheet into sections, and in that case, the wheels 68 are set idle with the cutter blade 66 out of operating position, and the longitudinal slit or cut insulating sheet may then be run onto a suitable receiving drum or roller 69 shown as mounted on a suitable frame 70 (see Fig. $1^a$).

The operation of the machine has probably been made clear from the foregoing description, but attention is further called to the following facts.

The fibrous sheet forming material or "half stock" in floating water is fed into the feed box, and its rate of discharge through the orifice 12 will be regulated directly by the setting of the gate 13 under the continued circulating movement and the small surplus stock will be carried over the partition 17 and back of the source of supply so that there will not be an overaccumulation of the stock or material within the said box. By the pockets of the distributing drum, the sheet forming stock is taken up evenly and evenly distributed on the perforated belt or endless screen 22, and the said screen, of course, moves with the sheet while it is passing over the rollers 23 and then leaves the said insulating sheet as it makes its return movement. By this perforated endless apron or screen, the fibrous sheet forming material is kept together in proper distribution until it has been given the necessary compactness and self-sustaining quality by the presser rollers. By the time the insulating sheet leaves the presser rollers, it will have been relieved of most of the water and the completion of the drying must be then quite rapidly effected by the hot drying rollers.

The entire operation from start to finish, in the making of the insulating sheet from the "half stock" and the cutting of the same to desired widths and thickness, is formed by a continuous or ceaseless operation. The machine, therefore, when continuously run has very large capacity and, as it requires very little attention, will produce insulating sheets at a minimum of cost, and moreover, will produce sheets of more uniform character and thickness than can be produced by automatic mechanism.

What I claim is:

1. In a machine of the kind described, a feed box having a partition extending upwardly from the bottom thereof and terminating below its top, provided with supply and return connections on opposite sides of said partition and having a lateral discharge orifice opening from that compartment thereof that is on the supply side of said partition, in combination with a distributing drum provided with peripheral pockets receiving the material from the discharge orifice of said feed box, an endless perforated apron receiving the material from said distributing drum, guide rollers for said apron, presser rollers between which said apron and the sheet of fibrous material is passed, and means for driving said distributing drum and presser rollers with properly timed actions.

2. In a machine of the kind described, a feed box having a partition extending upwardly from the bottom thereof and terminating below its top, provided with supply and return connections on opposite sides of said partition and having a lateral discharge orifice opening from that compartment thereof that is on the supply side of said partition, in combination with a distributing drum provided with peripheral pockets receiving the material from the discharge orifice of said feed box, an endless perforated apron receiving the material from said distributing drum, guide rollers for said apron, presser rollers between which said apron and the sheet of fibrous material is passed, means for driving said distributing drum and presser rollers with properly timed actions, and a trowel-board operative on the upper portion of the fibrous sheet, between said distributing drum and said presser rollers.

3. In a machine of the kind described, a feed box having a partition extending upwardly from the bottom thereof and terminating below its top, provided with supply and return connections on opposite sides of said partition and having a lateral discharge orifice opening from that compartment thereof that is on the supply side of said partition, in combination with a distributing drum provided with peripheral pockets receiving the material from the discharge orifice of said feed box, an endless perforated apron receiving the material from said distributing drum, guide rollers for said apron, presser rollers between which said apron and the sheet of fibrous material is passed, means for driving said distributing drum and presser rollers with properly timed actions, and a trowel board operating on the upper portion of the fibrous sheet, between said distributing drum and said presser rollers, the said trowel board being obliquely set and obliquely adjustable in respect to the surface of the fibrous sheet.

4. In a machine of the kind described, a feed box having a partition extending upwardly from the bottom thereof and terminating below its top, provided with supply and return connections on opposite sides of said partition and having a lateral discharge orifice opening from that compartment thereof that is on the supply side of said partition, in combination with a distributing drum provided with peripheral pockets receiving the material from the discharge orifice of said feed box, an endless perforated apron receiving the material from said distributing drum, guide rollers for said apron, presser rollers between which said apron and the sheet of fibrous material is passed, means for driving said distributing drum and presser rollers with properly timed actions, and a trowel board operating on the upper portion of the fibrous sheet, between said distributing drum and said presser rollers, and relatively small idle belt rollers underlying that portion of said endless apron that is immediately below said trowel board.

5. In a machine of the kind described, a feed box having a partition extending upwardly from the bottom thereof and terminating below its top, provided with supply and return connections on opposite sides of said partition and having a lateral discharge orifice opening from that compartment thereof that is on the supply side of said partition, in combination with a distributing drum provided with peripheral pockets receiving the material from the discharge orifice of said feed box, an endless perforated apron receiving the material from said distributing drum, guide rollers for said apron, presser rollers between which said apron and the sheet of fibrous material is passed, and means for driving said distributing drum and presser rollers with properly timed actions, the discharge orifice of said feed box having an adjustable gate.

6. In a machine of the kind described, a feed box having a partition extending upwardly from the bottom thereof and terminating below its top, provided with supply and return connections on opposite sides of said partition and having a lateral discharge orifice opening from that compartment thereof that is on the supply side of said partition, in combination with a distributing drum provided with peripheral pockets receiving the material from the discharge orifice of said feed box, an endless perforated apron receiving the material from said distributing drum, guide rollers for said apron, presser rollers between which said apron and the sheet of fibrous material is passed, means for driving said distributing drum and presser rollers with properly timed actions, and a curved deck extended from the lower portion of the discharge orifice of said feed box and closely following the outer downwardly moving portion of said distributing drum to a line immediately adjacent to the upper receiving portion of said endless apron.

7. In a machine of the kind described, a feed box having a partition upwardly from the bottom thereof and terminating below its top, provided with supply and return connections on opposite sides of said partition and having a lateral discharge orifice opening from that compartment thereof that is on the supply side of said partition, in combination with a distributing drum provided with peripheral pockets receiving the material from the discharge orifice of said feed box, an endless perforated apron receiving the material from said distributing drum, guide rollers for said apron, presser rollers between which said apron and the sheet of fibrous material is passed, means for driving said distributing drum and presser rollers with properly timed actions, and a multiplicity of drying drums under and over which the web of fibrous material is alternately passed.

8. In a machine of the kind described, the combination with front, rear and intermediate lower rollers, and an endless perforated apron running over the same, of a distributing drum overlying the said front roller and delivering the fibrous material onto said apron, means for supplying the fibrous material to said distributing drum, rollers overlying said rear and intermediate rollers and coöperating therewith to form presser rollers, means for driving said rollers and distributing drum, and means located between the front and rear rollers for continuously exerting pressure on the material.

9. In a machine of the kind described, the combination with front, rear and intermediate lower rollers, and an endless perforated apron running over the same, of a distributing drum overlying the said front roller and delivering the fibrous material onto said apron, means for supplying the fibrous material to said distributing drum, rollers overlying said rear and intermediate rollers and coöperating therewith to form presser rollers, means for driving said rollers and distributing drum, relatively small bed rollers located between said front and intermediate lower rollers, and a trowel board overlapping said small bed rollers and operating on the upper portion of the fibrous sheet between said distributing drum and the said intermediate lower roller and its coöperative overlying presser roller.

10. In a machine of the kind described, the combination with front, rear and intermediate lower rollers, and an endless perforated apron running over the same, of a distributing drum overlying the said front roller and delivering the fibrous material onto said apron, means for supplying the fibrous material to said distributing drum, rollers overlying said rear and intermediate rollers and coöperating therewith to form presser rollers, means for driving said rollers and distributing drum, relatively small bed rollers located between said front and intermediate lower rollers, a trowel board overlapping said small bed rollers and operating on the upper portion of the fibrous sheet between said distributing drum and the said intermediate lower roller and its coöperative overlying presser roller, a suction box underlying said perforated apron between said rear and intermediate lower rollers, and means for driving said distributing drum and presser acting rollers.

11. In a machine of the kind described, the combination with means for forming and drying sheets of fibrous material, of a transverse sheet cutter comprising a fixed transverse shearing bar, and a pair of rigidly connected laterally spaced rotary members having a transverse cutter but equipped with approximately V-shaped cutting edges.

In testimony whereof I affix my signature in presence of two witnesses.

KARL WESSEL.

Witnesses:
 CLARA DEMAREST,
 BERNICE G. BAUMANN.